May 5, 1970

K. H. CARPENTER 3,510,143

VEHICLE FLUID SUSPENSION LEVELING SYSTEM
WITH AUTOMATIC CONTROL VALVE
Filed July 26, 1968

INVENTOR.
Keith H. Carpenter
BY
C. L. Engle
ATTORNEY

United States Patent Office 3,510,143
Patented May 5, 1970

3,510,143
VEHICLE FLUID SUSPENSION LEVELING SYSTEM WITH AUTOMATIC CONTROL VALVE
Keith H. Carpenter, Kettering, Ohio, assignor to General Motors Corporation, Detroit, Mich., a corporation of Delaware
Filed July 26, 1968, Ser. No. 747,914
Int. Cl. B60g 17/00
U.S. Cl. 280—6                                   5 Claims

ABSTRACT OF THE DISCLOSURE

A vehicle fluid suspension system incorporating a control valve assembly sensing suspension height changes and automatically maintaining a desired vehicle height. The control valve accomplishes the feature by incorporating means varying the compression of separate springs urging inlet and exhaust valves open and closed, respectively. These valves are located within the control valve assembly and are biased by the springs with varying spring rates according to prevailing suspension heights. In a high vehicle position, the spring forces are relatively slight and the inlet valve is closed while the exhaust valve is slightly open to vent the system; in a normal position the springs are more compressed to increase the spring forces and both valves are closed; and in a low position, the springs are most extensively compressed tightly urging the exhaust valve closed while rapidly opening the inlet valve which simultaneously energizes a source supplying pressure fluid to the system until the normal height is obtained. The exhaust valve functions as a backpressure regulator maintaining a desired system pressure, a pressure relief valve preventing excessive system pressure, and a system maintaining valve biased closed with a relatively greater spring force progressively in the high, normal, and low suspension height positions.

This invention relates to fluid suspension systems and more particularly to a control valve assembly automatically maintaining the system level regardless of vehicle loads.

The use of fluid suspension systems is well known in the vehicle art and it is common practice to incorporate an automatic control or leveling valve in conjunction with these systems to maintain the vehicle level regardless of loads placed therein. It is also common practice to use these control valves in conjunction with a fluid suspension system to provide a predetermined clearance height between the sprung and unsprung vehicle masses. These features are accomplished by pressurizing the fluid and maintaining it in a reservoir for use when demanded by the control valve. Necessarily this type of system includes a reservoir, control valving, and sufficient piping to maintain the supply of pressure fluid in reserve. Therefore a purpose of this invention is to provide a fluid suspension system incorporating an automatic control valve which does not require a reservoir and its associated valving but still provides reliable operational results. It is also a purpose of this invention to provide an exhaust valve performing the separate multiple functions of a relief, back pressure and a system maintaining valve.

Accordingly among the objects of this invention is the provision of a fluid suspension control valve which automatically energizes a pressure fluid supply source when the height between the vehicle sprung and unsprung masses decreases below a normal level.

Another object of this invention is the provision of an automatic control valve utilizing movement of an inlet valve reciprocating therein to actuate an electrical switch energizing the pressure fluid supplying device.

A further object of this invention is the provision of an exhaust valve reciprocally movable within the control valve and being subjected to varying spring biasing forces to function as a backpressure valve and a pressure relief valve in high and normal vehicle height positions, respectively.

A still further object of this invention is the provision of an automatic control valve which contains a dampening fluid cushioning normal vehicle road vibrations so that the valve responds only to significant loading height changes between the sprung and unsprung masses.

Another object of this invention is the provision of a fluid suspension control valve incorporating check valves adjacent the inlet and exhaust valves so that dampening fluid will flow through metering orifices allowing poppet movement of the inlet and exhaust valves between their opened and closed positions.

A still further object of this invention is the provision of an automatic fluid suspension control valve including an exhaust valve that is biased closed by a spring force greater than that normally applied immediately prior to the opening of the inlet valve so that loss of pressure fluid to exhaust is positively prevented.

Figure 1:
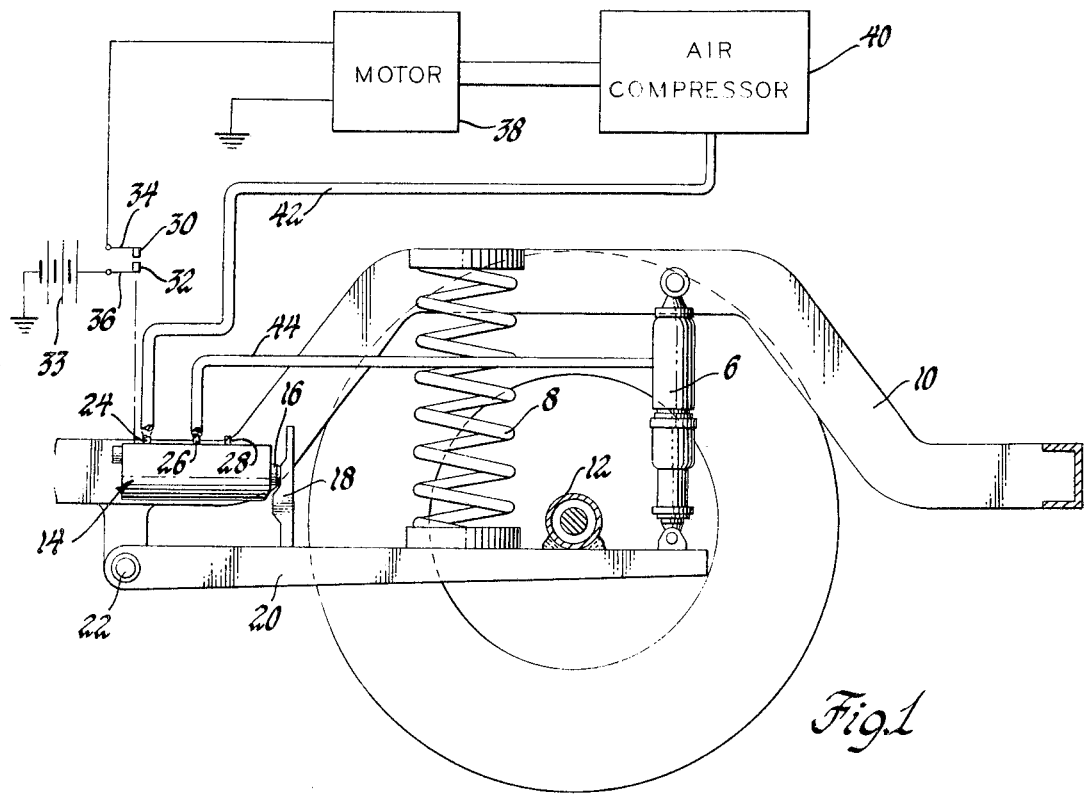
FIG. 1 is a fragmentary side elevational view, partly schematic and partly in section, showing a vehicle fluid suspension system incorporating a control valve constructed in accordance with this invention.

With reference to FIG. 1, a fluid spring 6 and a steel coil spring 8 combine to support a vehicle frame or sprung mass 10 upon an axle assembly or unsprung mass 12. A fluid suspension control valve 14 is mounted on frame 10 and comprises a cam follower 16 which engages valve actuating cam 18. The cam 18 is secured to a beam 20 which is welded to axle assembly 12 and is pivotally attached to frame 10 by pin 22.

Control valve 14 includes inlet port 24, fluid spring or cylinder port 26, and exhaust port 28 which are regulated in a manner later to be described. The control valve 14 contains switch contacts 30 and 32, projecting and schematically shown in circuit with a source 33 in FIG. 1. The normally open switch contacts are mounted on leaf springs 34 and 36 regulating an electrical circuit to motor 38 driving a fluid compressor 40. The fluid or air compressor 40 is connected to control valve inlet port 24 by supply line 42, and the spring 6 is connected to control valve 14 by fluid conducting line 44.

Figure 2:
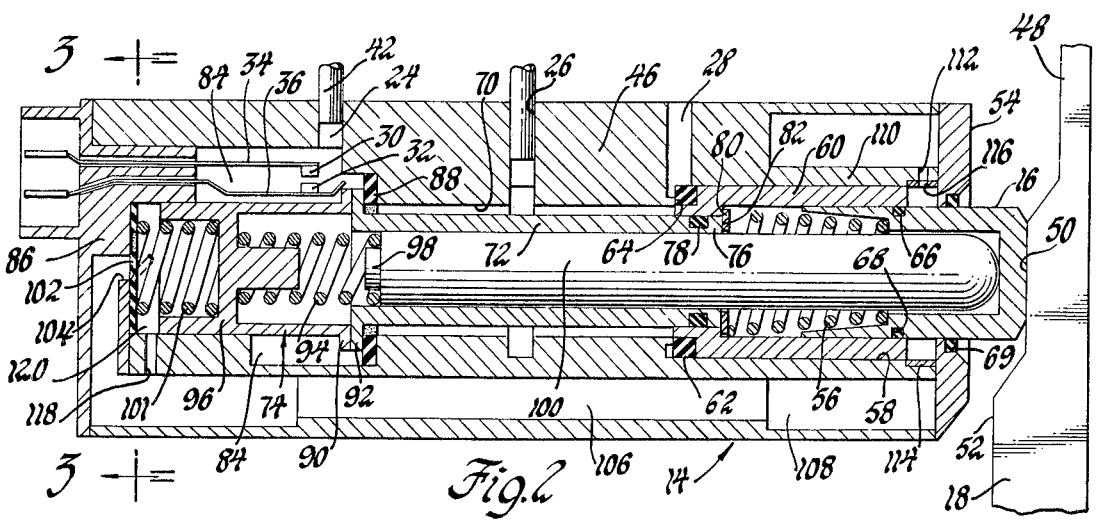
FIG. 2 is a sectional view taken along a central longitudinal axis of the subject inventive control valve.
Figure 3:
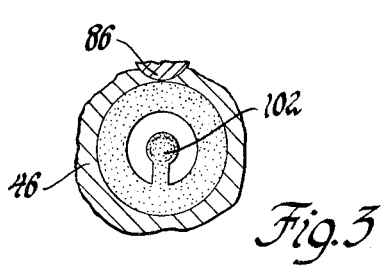
FIG. 3 is a sectional view taken on lines 3—3 of FIG. 2 illustrating a disk type check valve embodied in the control valve.
Figure 4:
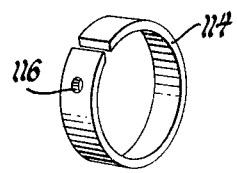
FIG. 4 is a perspective view showing a split-ring type check valve also utilized in the control valve.

The specific structure of control valve 14 is shown in FIG. 2 wherein a valve body member 46 contains the aforementioned inlet port 24, cylinder port 26, and exhaust port 28. Valve actuating cam 18 comprises stepped surfaces 48, 50 and 52 as shown in FIG. 2. These surfaces engage the cam follower 16 in accordance with the suspension height between beam 20 and the vehicle frame 10 as determined by the current vehicle load. The cam follower 16 is slidably disposed within one end 54 of the valve body 46 and is biased against the cam surfaces by a coil spring 56. Valve body 46 is machined to contain an exhaust chamber 58 that connects with exhaust port 28 and slidably receives exhaust valve 60 having a resilient valve ring 62 mounted thereon to engage annular seat 64 machined in the valve body 46. The cam follower 16 is also slidably disposed within the exhaust valve 60 and has an O-ring 66 mounted in a groove 68 engaging the interior surface of the exhaust valve 60 to prevent leakage of pressure fluid outside the valve body 46. An O-ring 69 is also placed in end 54 for this purpose.

The valve body 46 further includes a cylindrical central chamber 70 which receives tubular extension 72 of inlet valve 74. The terminal end 76 of the extension 72 supports an O-ring 78 which provides a fluid tight connection with exhaust valve 60. A washer 80 is positioned to engage end 76 and a shoulder 82 formed in exhaust valve 60 so that the coil spring 56 biases both of these members toward the left as viewed in FIG. 2. The valve body 46 also includes an inlet pressure chamber 84 adjacent end 86 of the valve body member. The inlet pressure chamber 84 connects with inlet port 24 and has a valve seating ring 88 positioned adjacent central chamber 70. The inlet valve 74 is fixedly connected to the tubular extension 72 via mating flanges 90 and 92, the latter of which engages the seating ring 88 when the inlet valve 74 is closed. These flanges can be secured together by any conventional means, such as by welding. As illustrated, inlet valve 74 can be in the form of a sleeve receiving a first spring 94 which at one end engages web 96 and at the other end is received upon boss surface 98 of a plunger 100 slidably disposed within the tubular extension 72 of inlet valve 74 and biased into continual engagement with cam follower 16. A second coil spring 101 is also received within the sleeve type inlet valve 74 to engage the side remote from spring 94 of web 96 at one end and bias a disk type chack valve 102 into engagement with the inner surface of valve body end member 86. Valve 102 regulates a calibrated orifice 104 which permits flow of dampening fluid to and from reservoir 106 for a purpose later to be described. The reservoir 106 extends longitudinally of valve body 46 and connects with an annular reservoir chamber 108 circumscribing exhaust valve 60, being separated therefrom by an annular web 110 in the valve body member. A metering orifice 112 is machined in the web 110 adjacent one end of exhaust valve 60 and the flow of fluid therethrough is regulated by a ring type check valve 114 which contains a precise metering orifice 116. Metering orifice 116 is positioned in alignment with metering port 112. A second metering orifice 118 is provided adjacent end 86 in body member 46 and connects chamber 120, between inlet valve 74 and check valve 102, with reservoir 106.

In operation, valve body member 46 is attached to the vehicle frame 10 as illustrated in FIG. 1 so that the cam follower 16 is biased into continual engagement with valve actuating cam 18 which is in turn secured to beam 20 on axle assembly 12. The cam surfaces 48, 50 and 52 correspond to high, normal, and low distances between the vehicle sprung and unsprung masses and depress the cam follower 16 accordingly. When the distance between the sprung and unsprung masses is low or below normal, in response to a relatively heavy vehicle load, cam surface 52 compresses the spring 56 to its greatest degree to insure fluid tight engagement of exhaust valve ring 62 with the annular seat 64. At this time the plunger 100 compresses spring 94 sufficiently to move inlet valve 74 against the force of the spring 101 holding disk valve 102 into engagement with valve body end member 86. The moment inlet valve 74 is slightly opened, pressure fluid acts upon a greater area of flange 92 so that the inlet valve snaps to an open position. Opening movement of inlet valve 74 forces a sufficient quantity of dampening fluid through orifice 118 to relieve chamber 120 between the end of the inlet valve and the disk check valve 102 so that this rapid movement of the valve can be achieved. Also switch contacts 30 and 32 are simultaneously closed by flanges 90 and 92 as the valve moves open. The circuit to motor 38 is closed and air compressor 40 supplies pressurized fluid through inlet port 24 until the distance between the sprung and unsprung masses returns to normal and cam surface 50 engages cam follower 16 whereby the spring forces are such that the inlet valve returns to a closed position and the system is in balance.

In a high position, cam surface 48 engages cam follower 16 and spring 56 is compressed to its least extent. In this condition, a minimum spring force is applied to exhaust valve 60 and the prevailing pressure of the fluid in the system, approximately 15 pounds per square inch, will slightly open the exhaust valve venting the system until cam surface 50 again engages the cam follower 16. When this occurs the exhaust valve is returned to a closed position due to an increase in the compression of spring 56. In the normal position spring 56 is compressed sufficiently to maintain the exhaust valve closed while the spring 101 engaging the disk type check valve 102 maintains inlet valve 74 closed and the switch contacts 30 and 32 are biased open by leaf spring members 34 and 36.

Utilization of the disk type check valve 102 provides for snap movement of the inlet valve 74 between its opened and closed positions. During opening movement of the inlet valve 74, a sufficient quantity of dampening fluid is forced through orifice 118 so that the valve may rapidly move. When it is urged toward a closed position by spring 101, the disk valve 102 is drawn away from orifice 104 as shown by broken lines in FIG. 2, so that dampening fluid can be drawn into chamber 120 and the inlet valve can consequently move rapidly closed with flange 92 engaging seating ring 88. Movement of the exhaust valve 60 toward an open position forces a sufficient quantity of dampening fluid through orifice 116 and metering port 112 allowing poppet opening movement. When the exhaust valve 60 moves toward a closed position, ring check valve 114 contracts and moves orifice 116 away from port 112 so that a greater quantity of dampening fluid may flow therethrough and the valve can snap to its closed position engaging ring 62 with annular seat 64.

From the above description it is apparent that this invention provides a fluid suspension system including a control valve providing functions not heretofore incorporated in such an assembly. Specifically, this arrangement includes an exhaust valve performing three functions, namely, the exhaust valve acts as a back pressure regulating valve when the distance between the frame and the axle assembly is above normal. During this condition the exhaust valve vents the system pressure while maintaining a predetermined desired system pressure. When the distance between the frame and the axle assembly is normal, the exhaust valve functions as a relief valve and will open to vent the system should the air compressor continue to operate after the normal suspension height is achieved. During a below normal suspension height condition the exhaust valve is biased closed with a maximum spring force preventing loss of pressure fluid to atmosphere. Of course it is apparent this invention can be used with either a liquid or an air system and function as above described.

A further advantageous characteristic of this invention resides in the inclusion of the reservoir 106 in the valve body so that a viscous fluid is directed through check valves 102 and 114 providing the snap action of the inlet and exhaust valves while also dampening road shock and preventing response of these valves to normal road frequencies. It is apparent the ports 104 and 112 and orifices 116 and 118 can be of any size to provide desired results.

While the above description is directed to a preferred embodiment, it is to be understood that other forms might be adopted.

I claim:

1. In a vehicle having a fluid suspension system supporting a sprung mass upon an unsprung mass, a control valve assembly comprising inlet and exhaust valves, spring means biasing said exhaust valve closed, spring means biasing said inlet valve closed, means sensing height changes between the sprung and unsprung masses, said sensing means variably compressing said springs in responce to prevailing suspension heights so that pressure fluid is automatically supplied to and discharged from the system maintaining a normal height regardless of vehicle load, the spring force urging said exhaust valve closed being greatest and said exhaust valve functioning as a relief valve when said inlet valve is open to increase suspension height, and pressure fluid supply means automatically energized by the opening movement of said inlet valve whereby fluid is supplied until a normal suspension height is reached and said inlet valve is closed.

2. In a vehicle having a fluid suspension system as described in claim 1 wherein said sensing means compresses said exhaust valve biasing spring so that intermediate and minimum biasing forces are respectively applied to said exhaust valve during normal and above normal suspension heights whereby said exhaust valve is a relief valve during normal heights and a back pressure valve maintaining a desired system pressure during above normal heights.

3. In a vehicle fluid suspension leveling system having a control valve actuating cam positioned in relation to the height between the sprung and unsprung masses; a control valve assembly comprising a body member having inlet, cylinder, and exhaust ports therein; an inlet valve reciprocally mounted within said body member regulating fluid flow through said inlet port; an exhaust valve reciprocally mounted within said body member regulating flow through said exhaust port; both of said valves being movable between open and closed positions to be selectively connected with said cylinder port so that fluid may flow to and from the vehicle suspension system; a cam follower reciprocally mounted within said valve body member and extending therefrom in continual engagement with said actuating cam; a first spring biasing said cam follower and said exhaust valve in opposite directions; a second spring biasing said inlet valve closed during above normal and normal suspension heights and being variably compressed by said valve actuating cam; said valve actuating cam compressing said first spring during normal vehicle heights to apply a predetermined spring force against said exhaust valve so that it acts as a relief valve; said valve actuating cam compressing said exhaust valve biasing spring a lesser degree when the height between the sprung and unsprung masses is above normal so that said exhaust valve acts as a back pressure regulating valve to maintain a desired pressure in the fluid suspension system while it is being vented; said valve actuating cam compressing said first and second biasing springs to their greatest extent applying the greatest spring force when the height is below normal and said inlet valve being biased open; said exhaust valve being biased closed prior to the opening of said inlet valve thereby preventing loss of system fluid; and switch means in said valve body in electrical circuit with a pressure fluid source means simultaneously actuated by opening movement of said inlet valve whereby the source means is energized to supply pressure fluid through said inlet port to said cylinder port until the suspension system reaches a normal height and said inlet and exhaust valves are again closed.

4. An automatic vehicle fluid suspension leveling control valve comprising a body member having inlet, cylinder, and exhaust ports therein; an inlet valve reciprocally mounted within said body member; an exhaust valve reciprocally mounted within said body member; a cam follower reciprocally mounted within said exhaust valve; a plunger member reciprocally mounted within said body member movable by said cam follower to actuate said inlet valve member; said cam follower engaging a vehicle attached cam movable in response to vehicle height between low, normal, and high positions; a first spring biasing said inlet valve closed; a second spring biasing said cam follower and said exhaust valve in opposite directions; switch means in said valve body member; said valve body member containing a reservoir filled with a viscous fluid adapted to dampen normal road shock and thereby prevent actuation of said valve in response to normal road frequencies during operation of the vehicle; said cam follower compressing said second biasing spring a limited degree when said suspension is in a high position whereby said exhaust valve acts as a back pressure regulating valve while pressure fluid is being drained from the suspension system through said exhaust port; said cam follower compressing said second biasing spring an intermediate degree and maintaining said valve closed so that it acts as a pressure relief valve while the suspension height is normal; said cam follower compressing said second biasing spring a greatest extent when said vehicle is in a low suspension position thereby urging said exhaust valve closed with a stronger relative force whereupon said plunger member opens said inlet valve by compressing said first biasing spring; the opening movement of said inlet valve simultaneously closing said switch means to energize an air compressor supplying pressurized fluid through said inlet port to said cylinder port until the vehicle is raised to its normal position and said valves are again closed; said air compressor switch means being opened by closing movement of said inlet valve; a first check valve adjacent one end of said exhaust valve; a second check valve adjacent one end of said inlet valve; said check valves being connected to said fluid reservoir and opening during movement of its adjacent valve so that said inlet and exhaust valves may rapidly open and close.

5. A vehicle fluid suspension leveling valve for use in combination with a vehicle fluid suspension system including a valve actuating cam movable with the vehicle sprung mass and an automatically energized air compressor supplying pressurized air to the suspension system comprising a valve body member; said valve body member containing inlet, cylinder, and exhaust ports; said valve body member further containing a reservoir filled with a viscous fluid; electrical switch means in said body member adjacent said inlet port; an inlet valve reciprocally mounted within said body member; a first spring biasing said inlet valve closed; and exhaust valve reciprocally mounted within said body member; a cam follower reciprocally disposed within said exhaust valve; a second spring disposed within said cam follower and said exhaust valve biasing them in opposite directions engaging said follower with said valve actuating cam; a plunger member received within said cam follower and reciprocally disposed within said inlet valve member; a first orifice in said body member connecting with said reservoir; a first check valve disposed adjacent said exhaust valve regulating the flow of viscous fluid through said first orifice; a second orifice in said body member connecting with said reservoir; a second check valve disposed adjacent said inlet valve regulating the flow of viscous fluid through said second orifice; said cam follower slightly compressing said second spring to bias said exhaust valve with a minimum force while said inlet valve is closed whereby said exhaust valve acts as a back pressure valve while the cylinder port is connected with the exhaust port and the sprung mass is being lowered to a normal height; said cam follower compressing said second spring a greater degree biasing said exhaust valve closed with an intermediate force when the sprung mass is at a normal height whereby said exhaust valve acts as a pressure relief valve; said cam follower compressing said second spring to its greatest extent biasing said exhaust valve closed with a maximum force when said plunger opens said inlet valve which simultaneously closes said switch means automatically energizing the air compressor supplying pressurized fluid to said inlet port until the actuating cam again closes said inlet valve.

References Cited

UNITED STATES PATENTS

| | | | |
|---|---|---|---|
| 3,326,239 | 6/1967 | Saint-Joanis | 137—625.27 |
| 3,254,899 | 6/1966 | Voorhies | 280—6 |
| 3,163,412 | 12/1964 | Troy. | |

PHILIP GOODMAN, Primary Examiner

U.S. Cl. X.R.

137—625.27